US008979238B2

(12) United States Patent
Nishikori et al.

(10) Patent No.: US 8,979,238 B2
(45) Date of Patent: Mar. 17, 2015

(54) IMAGE PROCESSING METHOD AND IMAGE PROCESSOR

(75) Inventors: Hitoshi Nishikori, Inagi (JP); Satoshi Masuda, Yokohama (JP); Tomoki Yamamuro, Kawasaki (JP); Osamu Iwasaki, Tokyo (JP); Norihiro Kawatoko, Yokohama (JP); Atsuhiko Masuyama, Yokohama (JP); Fumiko Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 96 days.

(21) Appl. No.: 13/459,919

(22) Filed: Apr. 30, 2012

(65) Prior Publication Data

US 2012/0287191 A1 Nov. 15, 2012

(30) Foreign Application Priority Data

May 10, 2011 (JP) ................................. 2011-105243
Apr. 18, 2012 (JP) ................................. 2012-094791

(51) Int. Cl.

| | |
|---|---|
| ***B41J 29/393*** | (2006.01) |
| ***B41J 2/195*** | (2006.01) |
| ***B41J 29/38*** | (2006.01) |
| ***B41J 2/205*** | (2006.01) |
| ***B41J 2/21*** | (2006.01) |
| ***G06K 15/10*** | (2006.01) |
| ***G06K 15/02*** | (2006.01) |

(52) U.S. Cl.

CPC ............. *B41J 2/2146* (2013.01); *G06K 15/102* (2013.01); *G06K 15/1868* (2013.01)
USPC ...................... 347/19; 347/7; 347/14; 347/15

(58) Field of Classification Search

USPC ............................................ 347/7, 14, 15, 19
See application file for complete search history.

(56) References Cited

U.S. PATENT DOCUMENTS

| | | | | |
|---|---|---|---|---|
| 6,120,129 | A | 9/2000 | Iwasaki et al. | |
| 6,244,681 | B1 | 6/2001 | Yano et al. | |
| 6,260,938 | B1 | 7/2001 | Ohtsuka et al. | |
| 6,439,683 | B1 * | 8/2002 | Matsumoto et al. | 347/15 |
| 6,464,322 | B2 * | 10/2002 | Dunand | 347/19 |
| 6,543,872 | B2 | 4/2003 | Ohtsuka et al. | |
| 6,601,938 | B1 | 8/2003 | Iwasaki et al. | |
| 2006/0181565 | A1 * | 8/2006 | Arazaki | 347/19 |
| 2006/0215192 | A1 * | 9/2006 | Nagahara et al. | 358/1.9 |
| 2012/0287194 | A1 | 11/2012 | Masuda et al. | |

FOREIGN PATENT DOCUMENTS

JP 11-320864 A 11/1999

OTHER PUBLICATIONS

U.S. Appl. No. 12/870,650, filed Aug. 27, 2010 to Kentaro Yano et al.

* cited by examiner

*Primary Examiner* — Sarah Al Hashimi
(74) *Attorney, Agent, or Firm* — Fitzpatrick, Cella, Harper & Scinto

(57) ABSTRACT

Provided are an inkjet printing apparatus and inkjet printing method that can, regardless of an ejection frequency of a print head, stabilize density of an image expressed on a print medium. For this purpose, an ink concentration integrated value is obtained according to the ejection history of each nozzle so as to be increased by data indicating non-ejection of the nozzle or decreased by data indicating ejection. Then, image data on the target pixel is corrected such that density of the target pixel is further reduced as the pixel is subjected to printing by a nozzle having a higher ink concentration integrated value.

22 Claims, 16 Drawing Sheets

| | | PRINT DATA | |
|---|---|---|---|
| | | 0 | 1 |
| | 0 | 1 | 0 |
| | 1 | 1 | -1 |
| | 2 | 1 | -2 |
| | • | • | • |
| | • | • | • |
| | | | |
| | • | • | • |
| | • | • | • |
| INK CONCENTRATION INTEGRATED VALUE | 162 | 1 | -162 |
| | • | • | • |
| | • | • | • |
| | | | |
| | • | • | • |
| | • | • | • |
| | 720 | 1 | -684 |
| | • | • | • |
| | • | • | • |
| | | | |
| | | | |

FIG.4

INPUT SIGNAL VALUE CORRECTION AMOUNT CALCULATING TABLE

| INK CONCENTRATION INTEGRATED AVERAGE VALUE | INPUT IMAGE SIGNAL (DENSITY SIGNAL) | | | | | | |
|---|---|---|---|---|---|---|---|
| | 0 | · | · | 230 | · | · | 255 |
| 0 | 0 | 0 | 0 | 0 | 0 | 0 | 0 |
| 1 | 0 | 0 | 0 | 0 | 0 | 0 | 0 |
| 2 | 0 | 0 | 0 | 0 | 0 | 0 | 0 |
| · | · | · | · | · | · | · | · |
| · | · | · | · | · | · | · | · |
| | | | | | | | |
| · | · | | | · | | | · |
| · | · | | | · | | | · |
| 162 | 8 | | | 2 | | | 0 |
| · | · | | | · | | | · |
| · | · | | | · | | | · |
| | | | | | | | |
| · | · | | | · | | | · |
| · | · | | | · | | | · |
| 720 | 16 | | | 4 | | | 0 |
| · | · | | | · | | | · |
| · | · | | | · | | | · |
| | | | | | | | |
| | | | | | | | |

FIG.6

IMAGE PROCESSING METHOD AND IMAGE PROCESSOR

BACKGROUND OF THE INVENTION

1. Field of the Invention

The present invention relates to an inkjet printing apparatus that uses ink to perform printing. More particularly, the present invention relates to a process that is intended for use with a nozzle having a small number of ejections and intended to suppress an increase in image density associated with ink concentration.

2. Description of the Related Art

In an inkjet print head provided with a plurality of nozzles that eject inks, the inks are ejected from a plurality of nozzles according to print data to thereby form an image on a print medium. In such a print head, ejection frequencies of the respective nozzles are different depending on the image to be printed, and in a nozzle having a low frequency, a volatile component of ink inside the ejection port may vaporize to concentrate the ink. If the ink inside the nozzle is concentrated, the color material concentration per ejection volume is also increased, and as a result, the density of the image expressed on the print medium is increased more than necessary.

For example, Japanese Patent Laid-Open No. H11-320864 (1999) discloses a method that, in an inkjet printing apparatus that superposes different inks to perform printing, predicts an increase in the value of ink concentration according to the number of times of the non-ejection of each ink, and on the basis of the increased value, corrects a signal value corresponding to the ink. By employing Japanese Patent Laid-Open No. H11-320864 (1999), even in the case where the number of times of ejection is small, and an increase in ink concentration occurs, image density substantially equivalent to the density of the image printed with ink having no concentration increase can be achieved.

Meanwhile, the configuration of Japanese Patent Laid-Open No. H11-320864 (1999) is based on the assumption that, even if any concentration increase occurs, if the nozzle performs a single ejection, ink having the increased concentration is discharged, and in the subsequent ejection, the ink having an ordinary concentration is discharged. However, according to examination by the present inventors, it is recognized that there is the case where actual ink concentration gradually proceeds from near the ejection port into a nozzle, and concentrated ink cannot be fully discharged by a single ejection. That is, in Japanese Patent Laid-Open No. H11-320864 (1999), even in the case where in order to discharge concentrated ink, ejection is required two or more times, concentration of the ink inside the nozzle is not taken into account. Accordingly, in Japanese Patent Laid-Open No. H11-320864 (1999), on the assumption that ink concentration inside the nozzle is overcome by the first ejection, and in the second or third ejection, the ink has ordinary concentration, a signal value corresponding to each ink is corrected, and therefore the output image may have higher density than usual to give rise to density unevenness.

SUMMARY OF THE INVENTION

The present invention is made in order to solve the above problem, and the objective thereof is to highly and accurately perform a process of suppressing density unevenness of an image printed on a print medium, which is caused by concentration of ink inside the nozzle of the print head.

In a first aspect of the present invention, there is provided an image processing method for an inkjet printing apparatus that prints an image on a print medium by a relative scan between a print head provided with a plurality of nozzles that eject ink and the print medium, the method comprising: an obtaining step of obtaining multivalued data corresponding to a first pixel on the print medium, and a first parameter that indicates a concentration degree of ink in a nozzle at a timing for printing the first pixel; a first generating step of, on the basis of the multivalued data corresponding to the first pixel and the first parameter, generating corrected multivalued data; a second generating step of, on the basis of the corrected multivalued data, generating ejection data that indicates ejection or non-ejection of the ink from the nozzle; and a third generating step of, on the basis of the first parameter and the ejection data, generating a second parameter that indicates an ink concentration degree of the nozzle at a timing for printing a second pixel that is a pixel adjacent to the first pixel and is to be subjected to printing by the nozzle subsequently to the first pixel.

In a second aspect of the present invention, there is provided an image processor for an inkjet printing apparatus that prints an image on a print medium by a relative scan between a print head provided with a plurality of nozzles that eject ink and the print medium, the image processor comprising: an obtaining unit configured to obtain multivalued data corresponding to a first pixel on the print medium, and a first parameter that indicates a concentration degree of ink in a nozzle at a timing for printing the first pixel; a first generating unit configured to, on the basis of the multivalued data corresponding to the first pixel and the first parameter, generate corrected multivalued data; a second generating unit configured to, on the basis of the corrected multivalued data, generate ejection data that indicates ejection or non-ejection of the ink from the nozzle; and a third generating unit configured to, on the basis of the first parameter and the ejection data, generate a second parameter that indicates an ink concentration degree of the nozzle at a timing for printing the second pixel that is a pixel adjacent to the first pixel and is to be subjected to printing by the nozzle subsequently to the first pixel.

In a third aspect of the present invention, there is provided an image processing method for an inkjet printing apparatus that prints an image on a print medium by a relative scan between a print head provided with a plurality of nozzles that eject ink and the print medium, the method comprising: an obtaining step of obtaining multivalued data corresponding to a first pixel on the print medium, and a first parameter that indicates a concentration degree of ink in a nozzle at a timing for printing the first pixel; a first generating step of, on the basis of the multivalued data corresponding to the first pixel and the first parameter, generating corrected multivalued data; and a second generating step of, on the basis of the first parameter and the corrected multivalued data, generating a second parameter that indicates an ink concentration degree of the nozzle at a timing for printing a second pixel that is a pixel adjacent to the first pixel and is to be subjected to printing by the nozzle subsequently to the first pixel.

Further features of the present invention will become apparent from the following description of exemplary embodiments (with reference to the attached drawings).

BRIEF DESCRIPTION OF THE DRAWINGS

FIG. 4 is a diagram illustrating an example of a lookup table that the ink concentration calculation part refers to;

FIG. 6 is a diagram illustrating an example of the lookup table that the image correction part refers to;

DESCRIPTION OF THE EMBODIMENTS

First Embodiment

Figure 2:
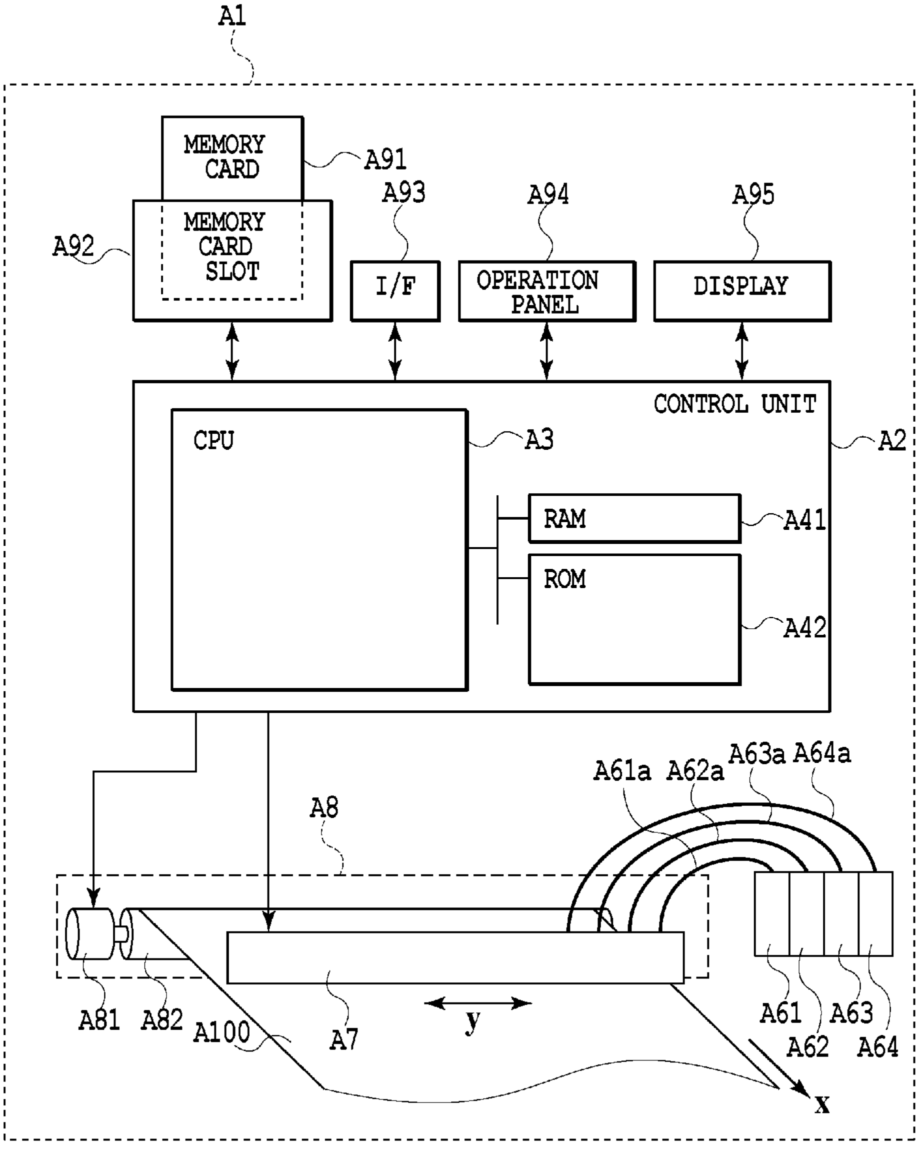
FIG. 2 is a diagram illustrating a schematic configuration of a printing apparatus that can be used in the first and second embodiments of the present invention.

FIG. 2 is a diagram illustrating a schematic configuration of a printing apparatus A1 used in the present embodiment. The printing apparatus A1 is an inkjet type line printer, and is provided with a control unit A2, ink cartridges A61 to A64, print head A7, print medium conveying mechanism A8, and the like.

The print head A7 is a full line type print head, and the surface thereof facing the print medium is provided with a plurality of thermal type nozzles that are arranged in a parallel pattern in a Y direction that intersects in a conveying direction (x direction). In the ink cartridges A61 to A64, inks corresponding to cyan, magenta, yellow, and black are respectively contained, and through ink introduction tubes A61*a* to A64*a*, supplied to the individual nozzles of the print head A7. Also, according to image data, the inks are ejected from the nozzles to perform printing on the print medium A100 that is conveyed in the x direction at a constant speed. Details of the print head A7 will be described later using FIG. 3.

The print medium conveying mechanism A8 is provided with a paper conveying motor A81 and a paper conveying roller A82. The paper conveying motor A81 rotates the paper conveying roller A82 to thereby convey the print medium A100 in the x direction at a constant speed with respect to the print head A7.

The control unit A2 is configured to mainly include a CPU A3, RAM A41, and ROM A42, and processes received image data or controls the print head A7 and paper conveying roller A81 to perform print operation. The CPU A3 develops a control program stored in the ROM A42 into the RAM 41 to execute it, and thereby performs various image processing as described later. Also, the CPU A3 generates image data that is printable by the print head A7, and controls the print head A7 and print medium conveying mechanism A8 to print images on the print medium.

Figure 3A:
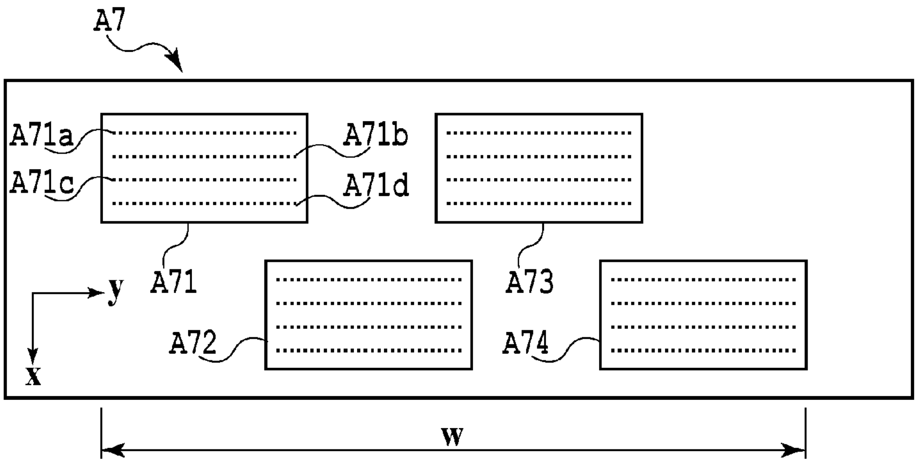
FIGS. 3A and 3B are diagrams of an ejection port surface of a print head.
Figure 3B:
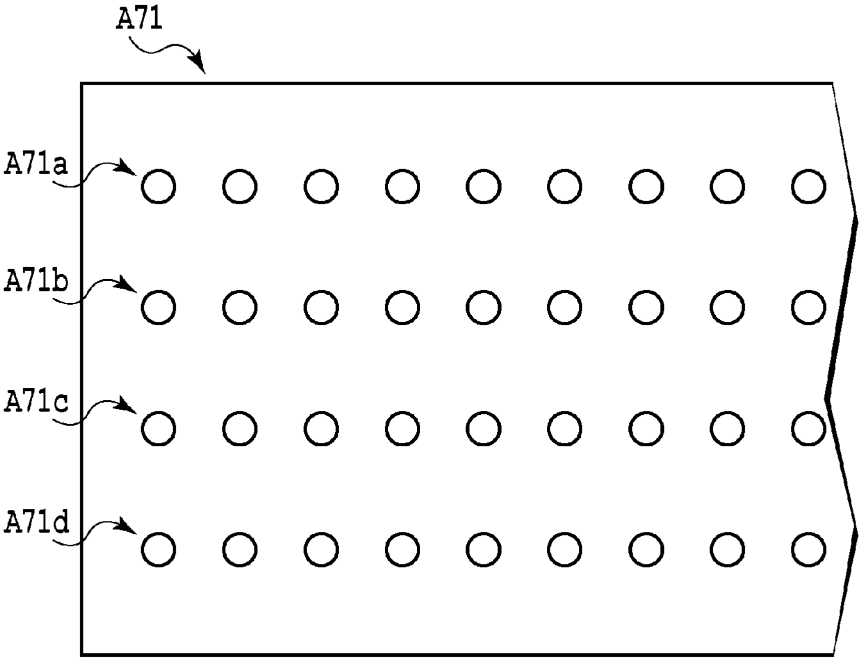

FIGS. 3A and 3B are diagrams of an ejection port surface of the print head A7. As illustrated in FIG. 3A, in the print head A7 of the present embodiment, a plurality of ejection substrates A71 to A74, each on which a plurality of nozzle arrays are arrayed, are arranged so as to be continuous in the y direction with being alternately displaced in the x direction. From the individual nozzles of such a print head, the inks are ejected onto the print medium that is conveyed in the x direction, and thereby an image corresponding to the width w of the nozzles arrayed on the print head A7 can be printed.

FIG. 3B is a diagram illustrating the state of arrangement of the nozzle arrays in one A71 of the ejection substrate. On one of the ejection substrate A71, four nozzle arrays A71*a* to A71*d* are arranged, and each of the nozzle arrays is configured to include a plurality of nozzles that is arranged in a predetermined direction (in this case, the y direction) at predetermined pitches (print resolution). In the present embodiment, the nozzle pitch in the y direction is 1200 dpi. Four nozzles that are included in the four nozzles arrays and at corresponding positions (hereinafter referred to as the same nozzle positions) along the x direction perform printing in the same and one column on the print medium that is conveyed.

Figure 1:
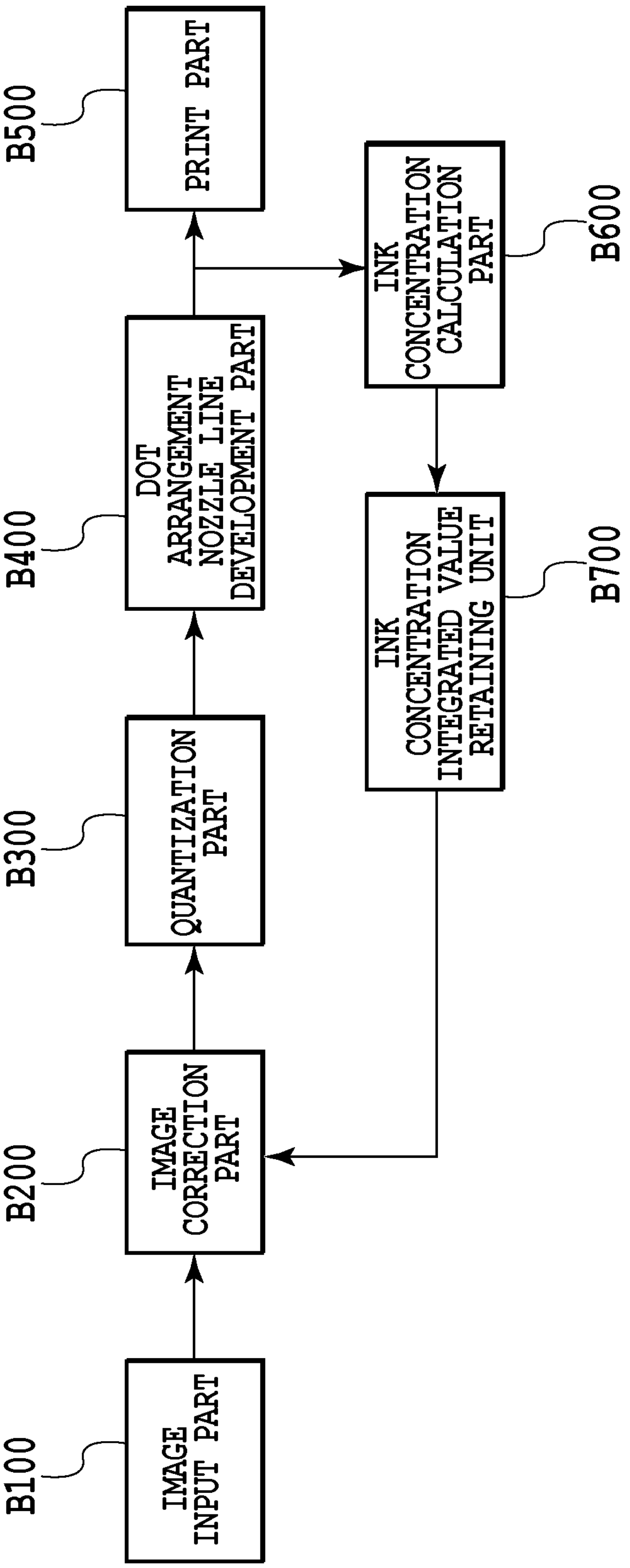
FIG. 1 is a block diagram illustrating a configuration of image processing in the first embodiment.
Figure 8:
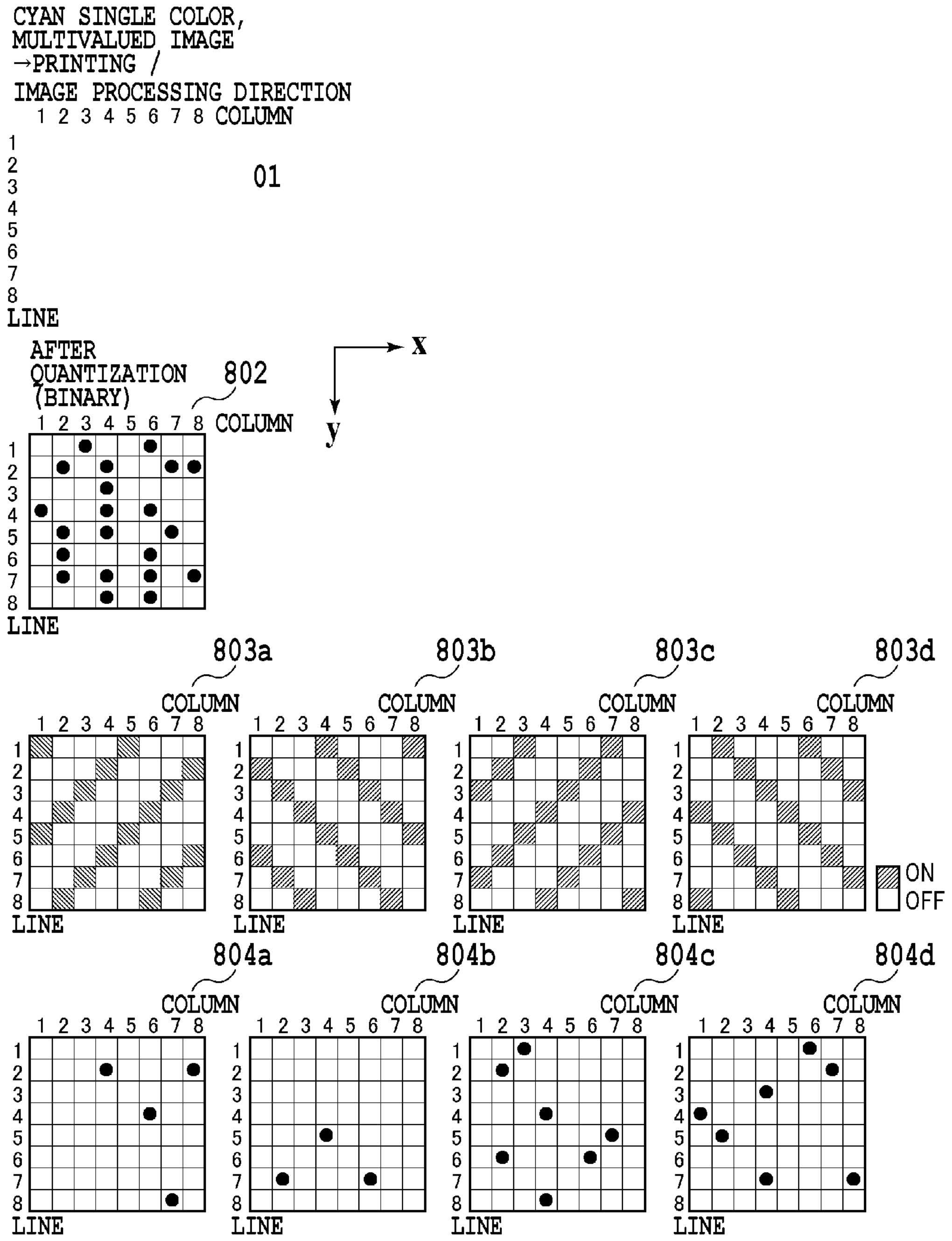
FIG. 8 is a diagram for explaining steps in which input image data corresponding to leading parts are subjected to image processing.

In the following, FIGS. 1 and 8 are used to describe the image processing of the present embodiment. FIG. 1 is a block diagram for explaining the configuration of the image processing of the present embodiment. Also, FIG. 8 is a diagram for specifically explaining steps of processing input image data corresponding to leading parts on the basis of the image processing illustrated in FIG. 1.

In FIG. 8, Reference numeral 801 represents leading parts of input image data received by an image input part B100, and indicates an 8×8 pixel area corresponding to nozzle positions 1 to 8 in the y direction and column positions, i.e., first to eighth columns, in the x direction. Here, cyan density data is illustrated as an example, and all pixels of 8×8 have a signal value of i=84. Each block illustrated in FIG. 1 performs the following image processing on such input image data sequentially from the upper left pixel in the diagram (first column of nozzle position 1) in the x direction one-by-one pixel. Note that in this example, the resolution of the respective pixels is 1200 dpi×1200 dpi. Also, the resolution of the image processing performed by each block coincides with the print resolution (nozzle resolution) with which the print head actually prints dots on the print medium.

The inputted density data (i=84) is first subjected to a predetermined correction process by an image correction part B200. The correction process performed here is a characteristic process of the present embodiment, and depending on the degree of ink concentration predicted for each nozzle, the signal values of the density data is corrected and outputted. Specifically, regarding a nozzle in which the degree of ink concentration is predicted to be high, the signal value is corrected in a minus direction, whereas regarding a nozzle in which the degree of ink concentration is predicted to be absent, the signal value is directly outputted. Note that immediately before the start of print operation, sufficient preliminary ejection has been performed by a print head maintenance process, and therefore if a target pixel serving as a pixel to be processed is the leading pixel, i.e., the pixel in the first column, it is determined that in any nozzle, ink is not concentrated. Accordingly, in the case of processing the upper left pixel (first column of nozzle position 1), the image correction part B200 directly outputs the input image data i=84 to a quantization part B300 (i'=84). Detailed processing performed by the image correction part B200 will be described later.

The quantization part B300 quantizes the inputted multivalued data i' to binary data that define printing (1) or non-printing (0) of dots. As a method for the quantization, a widely known method such as an error diffusion method or dither method can be employed. Reference numeral 802 indicates the result of quantizing the multivalued data by the quantization part B300. In this case, the result of quantizing the upper left pixel is dot non-printing (0).

The binary data outputted from the quantization part B300 are distributed by a dot arrangement nozzle array development part B400 as dot data (binary data) that the individual nozzle arrays A71*a* to A71*d* respectively print. Reference numerals 803*a* to 803*d* represent mask patterns for distributing the dot data 802 to the nozzle arrays A71*a* to A71*d*. These mask patterns are preliminarily stored in the ROM A42 of the printing apparatus. Specifically, 803*a* is a mask pattern of the nozzle array A71*a* that defines print-permitted pixels onto which the print head is permitted to eject ink, and 803*b* is a mask pattern that defines print-permitted pixels of the nozzle array A71*b*. Also, 803*c* is a mask pattern that defines print-permitted pixels of the nozzle array A71*c*, and 803*d* is a mask pattern that defines print-permitted pixels of the nozzle array A71*d*. In each of the mask patterns, pixels (ON) indicated by hatching represent pixels that permit corresponding nozzles to perform dot printing, whereas pixels (OFF) indicated by white represent pixels that do not permit dot printing. These four mask patterns respectively have print-permitted rates of 25% that indicates rate of pixels onto which the print head is permitted to eject ink, and have a mutually complementary relationship. The dot arrangement nozzle array development part B400 reads such mask patterns preliminarily stored in the ROM A42, and performs an AND process between the mask patterns and the dot data outputted from the quantization part B300. As a result, the dot data 802 are distributed as dot data 804*a* for the nozzle array A71*a*, dot data 804*b* for the nozzle array A71*b*, dot data 804*c* for the nozzle array A71*c*, and dot data 804*d* for the nozzle array A71*d*. That is, each of the dot data 802 is printed by any of A71*a*, A71*b*, A71*c*, and A71*d*. The upper left pixel (first column of nozzle position 1) is set as the dot non-printing (0) in all of the dot data patterns 804*a* to 804*d*, and a dot is not printed by any of the nozzle arrays. Note that, in the present embodiment, as indicated by 803*a* to 803*d*, the mask patterns having the mutually complementary relationship are used; however, mask patterns that permit a plurality of nozzles to eject ink onto the same pixel may be used.

Subsequently, the dot data for each of the nozzle arrays are sent to a print part B500, and ink ejection is performed by corresponding nozzle arrays. Regarding the upper left pixel (first column of nozzle position 1), printing is not performed by any nozzle array. Meanwhile, such dot data is also sent to an ink concentration calculation part B600.

In the ink concentration calculation part B600, on the basis of the dot data generated by the dot arrangement nozzle array development part B400, an ink concentration integrated value C of the corresponding nozzle is obtained. The ink concentration integrated value C herein refers to a parameter that indicates the degree of concentration of ink in each nozzle, and as the value increases, the ink concentration degree becomes higher, that is, a larger value indicates that ink is more concentrated. Immediately before the start of print operation, sufficient preliminary ejection is performed by the print head maintenance process, so that ink concentration does not occur in any of the nozzle arrays, and therefore the ink concentration integrated value (initial value) used to process the first column is set to 0.

In the case where, as in the upper left pixel in this example, data represents non-printing (0), concentration of ink in a corresponding nozzle proceeds just by an amount corresponding to the single non-ejection. Therefore, the ink concentration calculation part B600 adds 1 to the current ink concentration integrated value (C=C+1). On the other hand, in the case where data represents printing (1), concentration of ink in a corresponding nozzle is reduced just by an amount corresponding to the single ejection. Therefore, the ink concentration calculation part B600 obtains the amount of the reduction, i.e., a minus variation ΔC in ink concentration integrated value, using an ink concentration integrated value variation calculating function or an ink concentration integrated value variation calculating table, and adds it to the current ink concentration integrated value C (C=C+ΔC). The ink concentration integrated value variation calculating function or the ink concentration integrated value calculating table is described below.

Figure 5:
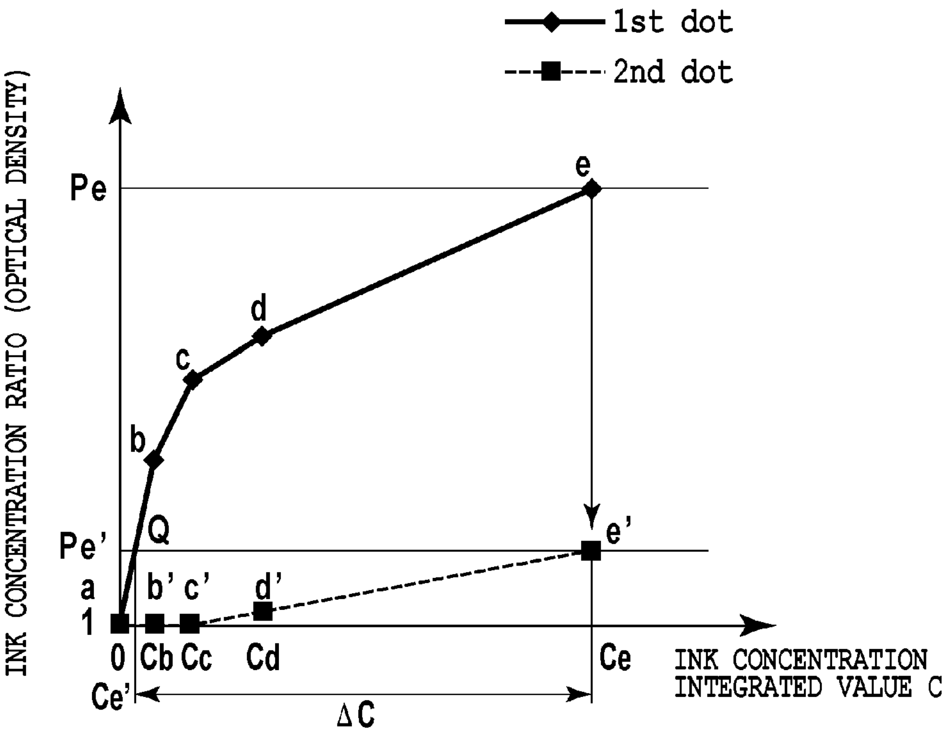
FIG. 5 is a diagram illustrating the relationship between an ink concentration integrated value and the degree of actual ink concentration.

FIG. 5 is a diagram illustrating the relationship between an ink concentration integrated value and the degree of actual ink concentration in one nozzle. The horizontal axis represents the ink concentration integrated value C in the present embodiment. In the situation where non-printing pixels are continuously present, the ink concentration integrated value C corresponds to a non-ejection time period or the number of the continuous non-printing pixels. The vertical axis represents an ink concentration ratio. The ink concentration ratio in the present embodiment refers to a value indicating the ratio of optical density (OD) of a dot that is printed when the ink concentration occurs to the optical density of a dot that is printed when the ink concentration does not occur. That is, in the case where the ink concentration does not occur (in the case where the ink concentration integrated value C=0), the ink concentration ratio is 1.

In the diagram, a solid line indicates ink concentration ratios of first dots (first ejection) for the case of, using the inks corresponding to a plurality of ink concentration integrated values C to continuously print two dots (twice ejections). It turns out that as the ink concentration integrated value C is increased, the ink concentration ratio increases. On the other hand, a dashed line indicates ink concentration ratios of second dots (second ejection) for the case of printing continuous dots under the same condition as that for the solid line. As in the case of the first dots, as the ink concentration integrated value is increased, the ink concentration ratio increases; however, the degree of the slope of the ratio is sufficiently small as compared with the first dots. That is, even if the ink concentration integrated value C takes any value, the ink concentration ratio is considerably reduced by the first ejection. However, as can be seen from the diagram, it is not that the ink concentration ratio completely returns to the initial ink concentration ratio (1).

For example, in the case of using ink having an ink concentration integrated value of Ce to perform ejecting operation continuously twice, the ink concentration ratio of the first dot formed on the print medium is Pe, and that of the second dot is Pe'. Here, the ink concentration integrated value of the first dot corresponding to the ink concentration ratio Pe' of the second dot is Ce', that is reduced by ΔC from Ce. That is, it can be thought that in the case of using ink having an ink concentration integrated value of Ce to perform single ejecting operation, the ink concentration integrated value is reduced by ΔC. Note that regarding such a variation ΔC in ink concentration integrated value, values corresponding to respective ink concentration integrated values C can be obtained by preliminarily examining the relationship between the ink concentration integrated value C and the ink concentration ratio as in FIG. 5.

For example, as in FIG. 5, in the case where the ink concentration ratios corresponding to the ink concentration integrated values at the five points (0, Cb, Cc, Cd, and Ce) are known, the function that obtains ΔC from coordinates of each of the points can be prepared as follows:

In the case where data on a target pixel is 0 (non-printing), $$\Delta C=1;$$

in the case where data on a target pixel is 1 (printing), and the ink concentration integrated value C meets 0≤C<Cb, $$\Delta C=(-1)\times(m1\times C+n1);$$

in the case where data on a target pixel is 1 (printing), and the ink concentration integrated value C meets Cb≤C<Cc, $$\Delta C=(-1)\times(m2\times C+n2);$$

in the case where data on a target pixel is 1 (printing), and the ink concentration integrated value C meets Cc≤C<Cd, $$\Delta C=(-1)\times(m3\times C+n3);\text{ and}$$

in the case where data on a target pixel is 1 (printing), and the ink concentration integrated value C meets Cd≤C, $$\Delta C=(-1)\times(m4\times C+n4).$$

Here, m1 to m4 and n1 to n4 are positive values that can be calculated from coordinates of the respective points in FIG. 5. In this case, the ink concentration calculation part B600 in the present embodiment obtains ΔC from the above expressions according to the current ink concentration integrated value C and data on a target pixel, and then calculates the new ink concentration integrated value C=C+ΔC.

Note that, in the above, on the basis of functions in which the measurement results at the plurality of points are interpolated by straight lines, the above calculation expressions for obtaining the variation ΔC are prepared; however, for example, a plurality of measurement points may be approximated by a curved line to prepare an expression that obtains the variation ΔC in ink concentration integrated value from the ink concentration integrated value.

Also, such a ΔC value that is related to the ink concentration integrated value C and print data on a target pixel can also be preliminarily stored in a lookup table.

FIG. 4 is a diagram illustrating an example of a lookup table that the ink concentration calculation part B600 refers to in order to obtain the ΔC value from an ink concentration integrated value C. In the diagram, in the case where print data represents non-printing (0), a variation ΔC in ink concentration integrated value is ΔC=1 independently of the ink concentration integrated value. On the other hand, in the case where print data represents printing (1), the variation ΔC in ink concentration integrated value is 0 or a negative value. If such a lookup table is prepared in advance, as compared with the configuration in which the above-described expressions are used to calculate ΔC, the processing time period in the ink concentration calculation part B600 can be shortened.

If the number of ink concentration integrated values (the number of vertical levels) prepared in the lookup table is too large, the levels may be thinned to reduce the size of the lookup table. For example, numerical values obtained by performing bit shifting on the ink concentration integrated values to reduce the number of binary digits may be used to reduce the number of levels. Alternatively, another lookup table may be used to make a conversion that arranges levels of an ink concentration integrated value into a smaller number of numerical values, and by using the converted numerical values for levels of an ink concentration integrated value variation calculating table, the number of levels may be reduced. In this case, in a region where the variation ratio between variations ΔCs is large, i.e., in a region where ink concentration integrated values are relatively small, it is preferable to keep the level thinning less. On the other hand, in a region where the variation ratio between variations ΔCs is small, i.e., in a region where ink concentration integrated values are relatively large, the level thinning can be more minutely performed.

Returning to FIG. 1, the following process is described. The new ink concentration integrated value C=C+ΔC calculated on the basis of the above-described method by the ink concentration calculation part B600 is stored in an ink concentration integrated value retaining unit B700. In the example of the upper left pixel in FIG. 8, the ink concentration integrated value C is the initial value of 0 for any of the nozzles, and the print data is 0 leading to the variation ΔC=1, so that the new ink concentration integrated value C=0+1=1. The ink concentration integrated value retaining unit B700 stores the latest ink concentration integrated value C for each of the nozzle arrays.

Here, an image correction method in the image correction part B200 is described in detail.

Figure 7:
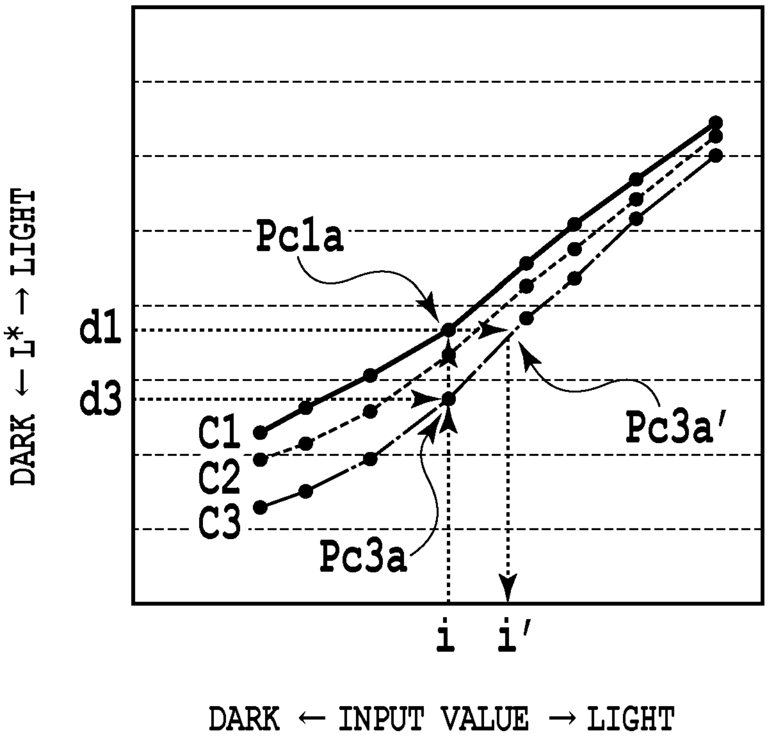
FIG. 7 is a diagram illustrating a relationship between the input value of an image and image density (lightness) printed on the print medium.

FIG. 7 is a diagram illustrating the relationship between the input value of an image and image density (lightness) printed on a print medium. The horizontal axis represents the input value, and the lightness increases toward right, which in turn indicates that the signal value of multivalued density data inputted to the image input part B100 is small. Also, the vertical axis represents the lightness of the image printed on the print medium, and as the value is increased, the image is lighter, which in turn indicates that the density is lower.

Also, FIG. 7 illustrates the relationship between the input value and the image lightness for the case of using each of three types of inks respectively having different concentration ratios. C1 indicates the relationship between the input value and the lightness for the case of using ink having an ink concentration ratio of 1.0, i.e., normal ink in which concentration does not occur. On the other hand, C2 and C3 indicate the relationships between the input value and the lightness for the cases of using inks having concentration ratios of 1.2 and 1.4, respectively. In any of the concentration ratios, as the input value indicates darker, i.e., as the signal value inputted to the image input part B100 is increased, the lightness of the image printed on the print medium becomes lower (i.e., density becomes higher). Also, as the ink concentration ratio is increased, the lightness at each input value becomes lower (density becomes higher).

In the present embodiment, the input signal value is corrected depending on the value of the ink concentration ratio so as to, even in the case of ink having any concentration ratio value, achieve the same locus as that for the concentration ratio of 1.0. Specifically, in the case where the signal value i is inputted for the ink having the concentration ratio of 1.4, the image lightness becomes d3 at the unchanged signal value; however, in order to correct this to achieve the same lightness d1 for the locus C1, the input signal i is converted to the signal value i' that sets the image lightness to d1 on the locus C3. That is, Δi=i'−i is the correction amount necessary for the input signal value in the image correction part B200.

Note that the relationship between the ink concentration integrated value C and the ink concentration ratio can be readily obtained from the graph in FIG. 5. Therefore, if the relationship between the input value and image lightness (or density) as illustrated in FIG. 7 is examined for various ink concentration ratios, from various combinations between the ink concentration integrated value and the input image signal value, a lookup table that enables the appropriate correction value Δi to be obtained can be prepared.

FIG. 6 is a diagram illustrating an example of the above-described lookup table that the image correction part of the present embodiment refers to. In the diagram, the vertical axis represents the average value (ink concentration integrated average value) of ink concentration integrated values of four nozzles at the same nozzle position (same column position) in the four nozzle arrays A71*a*, A71*b*, A71*c*, and A71*d*. Also, the horizontal axis represents the density signal that is inputted to the image correction part B200 and represented by 0 to 255. The image correction part B200 obtains the average value from ink concentration integrated values, which are retained by the ink concentration integrated value retaining unit B700, of four nozzles that are at the same column position and included in the different nozzle arrays, and sets the average value as the ink concentration integrated average value. With reference to the lookup table in FIG. 6, according to a combination of the ink concentration integrated average value obtained in this manner and an image signal inputted from the image input part B100, the correction amount Δi is obtained. Further, by subtracting the obtained correction amount Δi from the input image signal i, the corrected signal value i' is obtained.

The quantization part B300 uses such a corrected signal value i' to perform the quantization, and at the same time, proceeds with the image processing on a corresponding pixel, and thereby image density equivalent to that for the case of printing the image with ink having no ink concentration is expressed on the print medium.

Note that, also regarding the lookup table illustrated in FIG. 6, if the number of levels is too large, as with the lookup table described in FIG. 4, level values in the ink concentration integrated average value may be thinned in the region where the variation ratio is small.

Figure 16:
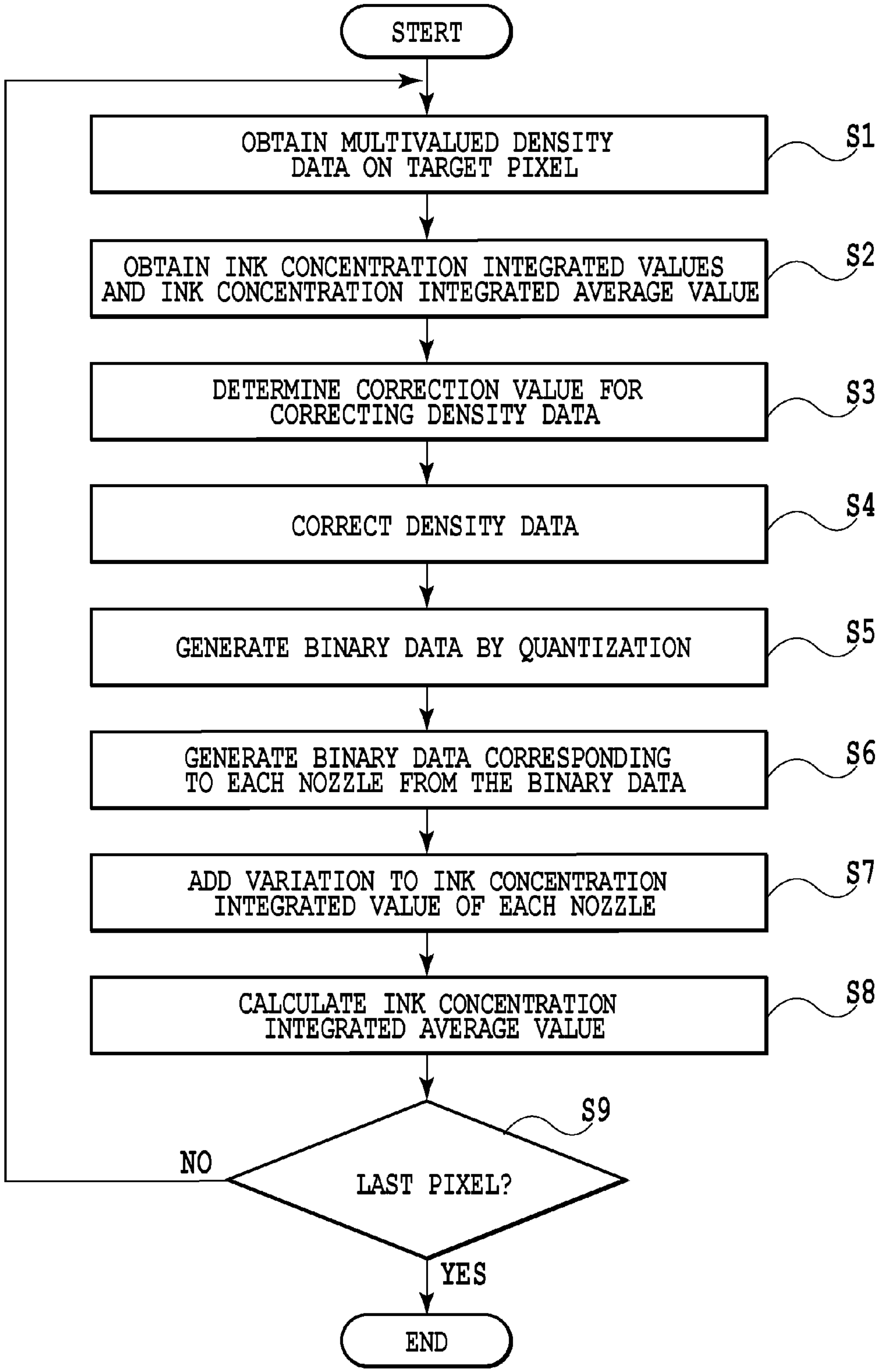
FIG. 16 is a flowchart for explaining the image processing in the first embodiment.

The flow of the image processing having been described so far is described with use of a flowchart illustrated in FIG. 16. First, in Step S1, the image correction part B200 obtains multivalued density data (input signal i) corresponding to the target pixel from the image input part B100. Then, in Step S2, ink concentration integrated values and the ink concentration integrated average value stored in the ink concentration integrated value retaining unit B700 are obtained. The ink concentration integrated values and the ink concentration integrated average value correspond to four nozzles that can perform printing on the target pixel. The four nozzles are nozzles that are at the same position as the column direction and at the same nozzle position. In Step S3, on the basis of the density data obtained in Step S1 and the ink concentration integrated average value obtained in Step S2, the lookup table illustrated in FIG. 6 is referred to, to determine the correction value (correction value Δi) for correcting the density data. Subsequently, the correction value determined in Step S3 is used to correct the density data on the target pixel, and the corrected data is outputted to the quantization part B300 (Step S4). In the quantization part B300, the multivalued density data on the target pixel, which is corrected in Step S4, is quantized to generate binary data that indicates printing/non-printing of a dot, and the binary data is outputted to the dot arrangement nozzle array development part B400 (Step S5). After that, in the dot arrangement nozzle array development part B400, the mask patterns are used to, on the basis of the received binary data, generate four data respectively corresponding to the four nozzles that perform printing on the target pixel, and the four data are outputted to the print part B500 and ink concentration calculation part B600 (Step S6). In Step S7, in the ink concentration calculation part B600, for each of the four nozzles, on the basis of whether or not an ink dot is ejected in printing on the target pixel, a variation (ΔC) in ink concentration integrated value is obtained with reference to the lookup table illustrated in FIG. 4. Then, by adding the variation ΔC to the ink concentration integrated value of each of the nozzles obtained in S1, the ink concentration integrated value that has been changed by performing printing on the target pixel and indicates the ink concentration degree of each of the nozzles is calculated. That is, ink concentration integrated values, which are used to process a pixel that is to be printed with use of the four nozzles subsequently to the target pixel, is obtained. In Step S8, on the basis of the ink concentration integrated value calculated in S7 for each of the nozzles, the ink concentration integrated average value for the four nozzles is calculated, and the calculated value is stored in the ink concentration integrated value retaining unit B700. Finally, in Step S9, it is determined whether or not the target pixel is the last pixel among pixels to be printed, and if it is the last pixel, the processing is terminated. On the other hand, if it is not the last pixel, the above-described processing steps in Steps S1 to S8 are performed on the pixel that is subjected to printing with the four nozzles subsequently to the target pixel, and the processing steps are continued until the processing is performed on the last pixel.

Figure 9A:
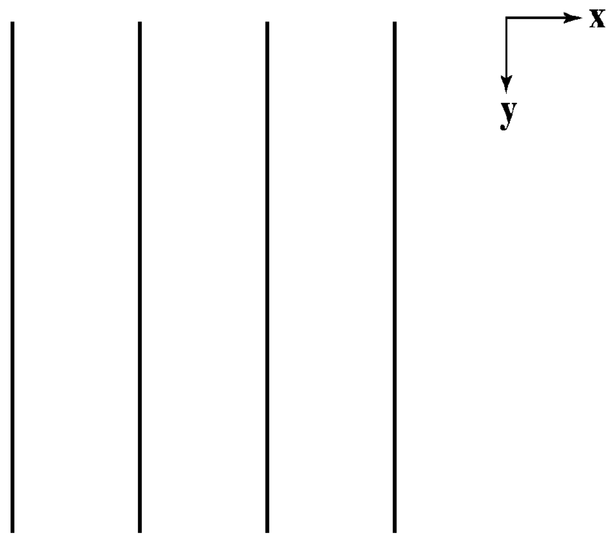
FIGS. 9A and 9B are diagrams for explaining a specific effect of the present invention.
Figure 9B:
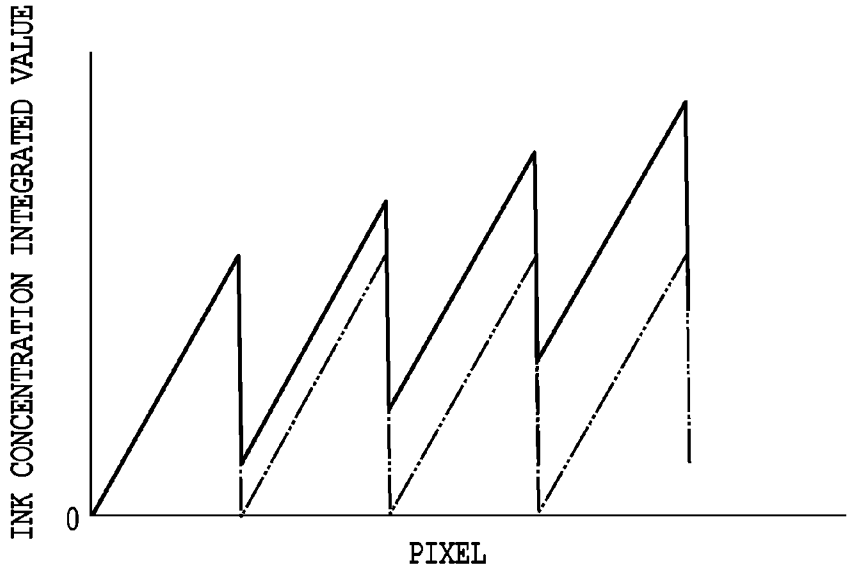

FIGS. 9A and 9B are diagrams for explaining the specific effect of the present embodiment. FIG. 9A illustrates a ruled line pattern, and a plurality of ruled lines that extend in a y direction are arranged in parallel at relatively long intervals in an x direction. In the case of printing such ruled lines pattern, each of the nozzles arrayed in the y direction repeats one-dot ejection at predetermined intervals onto a print medium that is conveyed in the x direction.

FIG. 9B is a diagram illustrating the relationship between a pixel position on a print medium and an ink concentration integrated value C of one nozzle for the case of performing printing as in FIG. 9A. At the start time of the printing, the ink concentration integrated value C is the initial value of 0; however, as non-printing pixels continuously appear, the ink concentration integrated value C is gradually increased. Then, when the first printing pixel is arrived at, single ejection is performed, and the ink concentration integrated value C decreases at a stretch. Subsequently, non-printing pixels again continuously appear, and thereby the ink concentration integrated value is gradually increased.

In the case of continuously performing such periodic ejecting operation, if the ink concentration integrated value is sufficiently decreased to 0 by a single ejection, the ink concentration integrated value flows as a locus as illustrated by a dashed line. In already described Japanese Patent Laid-Open No. H11-320864 (1999), on the assumption of following such a locus, image processing is performed. However, as in this example, in the case where as compared with the number of printing pixels, the number of continuous non-printing pixels is sufficiently large, the increased ink concentration integrated value is not restored to 0 by a single ejection, and the ink concentration integrated value follows a locus as indicated by the solid line. Even in such a case, in the configuration of Japanese Patent Laid-Open No. H11-320864 (1999), the same image processing as that performed in the case of using un concentrated ink is performed on the pixel immediately after printing, and therefore density of the ruled line pattern may be gradually increased, or the concentration degree may be increased too much to bring on improper ejection. On the other hand, by employing the present embodiment, an accurate ink concentration integrated value C can be timely obtained, and on the basis of a correction amount corresponding to the value, the image processing can be performed on each pixel, so that a ruled line pattern having appropriate density can be stably printed.

Note that, in the description of FIG. 1, after the quantization process has been performed, the binary mask patterns corresponding to the respective nozzle arrays are used to distribute the dot data into the respective nozzle arrays; however, the present embodiment is not limited to such a configuration. If the ink concentration calculation part B600 can calculate the ink concentration integrated value of each nozzle on the basis of binary data related to the respective nozzle arrays, the present embodiment is effective, and the method for quantization or distributing data to the respective nozzle arrays are not particularly limited. For example, by preparing dither patterns corresponding to the respective nozzle arrays, multivalued data can also be collectively converted to binary data on the respective nozzle arrays.

Also, in the above, described is a configuration in which on each of the ejection substrates, the four nozzle arrays are arrayed; however, it should be appreciated that the present invention can also respond to a configuration having five or more (N) nozzle arrays, or to the case of a print head provided with only one nozzle array. In the case of performing printing with N nozzle arrays, the image correction part B200 corrects respective input image data on the basis of ink concentration integrated values of N nozzles involved in printing of the target pixel. In the case where the number of nozzle arrays is one, the number of ink concentration integrated values is one for each column, so that the processing steps of obtaining the ink concentration integrated average value corresponding to the target pixel (Step S1 in FIG. 16) and calculating the integrated average value for the pixel subsequent to the target pixel are omitted, and the ink concentration integrated value can be used in the image correction part B200 as it is.

As described above, according to the present embodiment, in the inkjet printing apparatus using the full line type print head, from arrangement of non-printing data (0) or printing data (1) on each nozzle, the ink concentration integrated value at the time is accurately obtained, and depending on the value, density data is corrected. Also, in the past, it has been determined that if ink is ejected onto a target pixel, concentration of the ink is overcome; however, in the present embodiment, a parameter called the ink concentration integrated value that indicates the degree of concentration of ink in the nozzle can be used to know in detail how the degree of the ink concentration in the nozzle is changed by printing on the target pixel. The ink concentration integrated value is, as illustrated in FIG. 4, not decreased to 0 even by ejection of an ink droplet if the degree of concentration of ink in the nozzle is high (ink concentration integrated value is high). Based on this, a change in parameter due to printing on each pixel can be reflected in the correction of the pixel that is subjected to printing subsequently to the target pixel; the image processing appropriately corresponding to ink concentration that is changed depending on the ejection history can be performed with high accuracy; and a stable image having no density change can be outputted.

Note that, in the present embodiment, in Steps S5 to S8 of FIG. 16, described is a configuration that is provided with the lookup table for obtaining a variation on the basis of binary data generated by quantizing multivalued density data on the target pixel and the ink concentration integrated value; however, the present invention is not limited to this, but may have a configuration that is provided with a lookup table for obtaining a variation on the basis of multivalued density data on the target pixel and the ink concentration integrated value. For example, in the case where the number of nozzle arrays is one, the number of nozzles that can perform printing on the target pixel is only one, and therefore ejection/non-ejection from the nozzle can be determined from multivalued data. For this reason, without performing the quantization process, on the basis of the multivalued density data, the variation can be obtained.

Second Embodiment

In the present embodiment, described is image processing for the case where the print resolution of the printing apparatus is higher than the image resolution inputted to the image input part. In the present embodiment, the printing apparatus illustrated in FIG. 2 and the print head having a nozzle resolution of 1200 dpi illustrated in FIG. 3 are used, and the resolution of inputted multivalued image data is 600 dpi. That is, quantization is performed to generate data on four pixels having 1200 dpi×1200 dpi for one pixel (600 dpi×600 dpi) in the inputted image data. Also, to print the data on the four pixels, nozzles at the same nozzle positions in two nozzle arrays, i.e., eight nozzles are used, and therefore to obtain a concentration integrated average value, an average of concentration integrated values of the eight nozzles is obtained.

Figure 10:
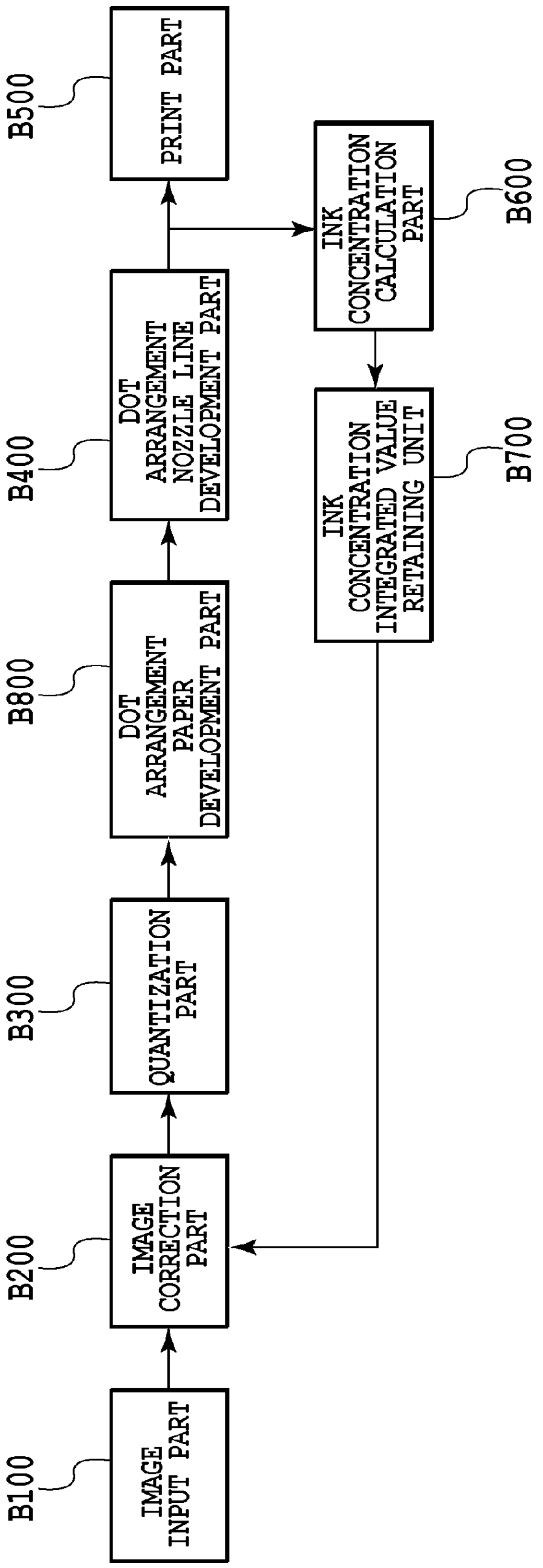
FIG. 10 is a block diagram for explaining a configuration of image processing in the second embodiment.
Figure 11:
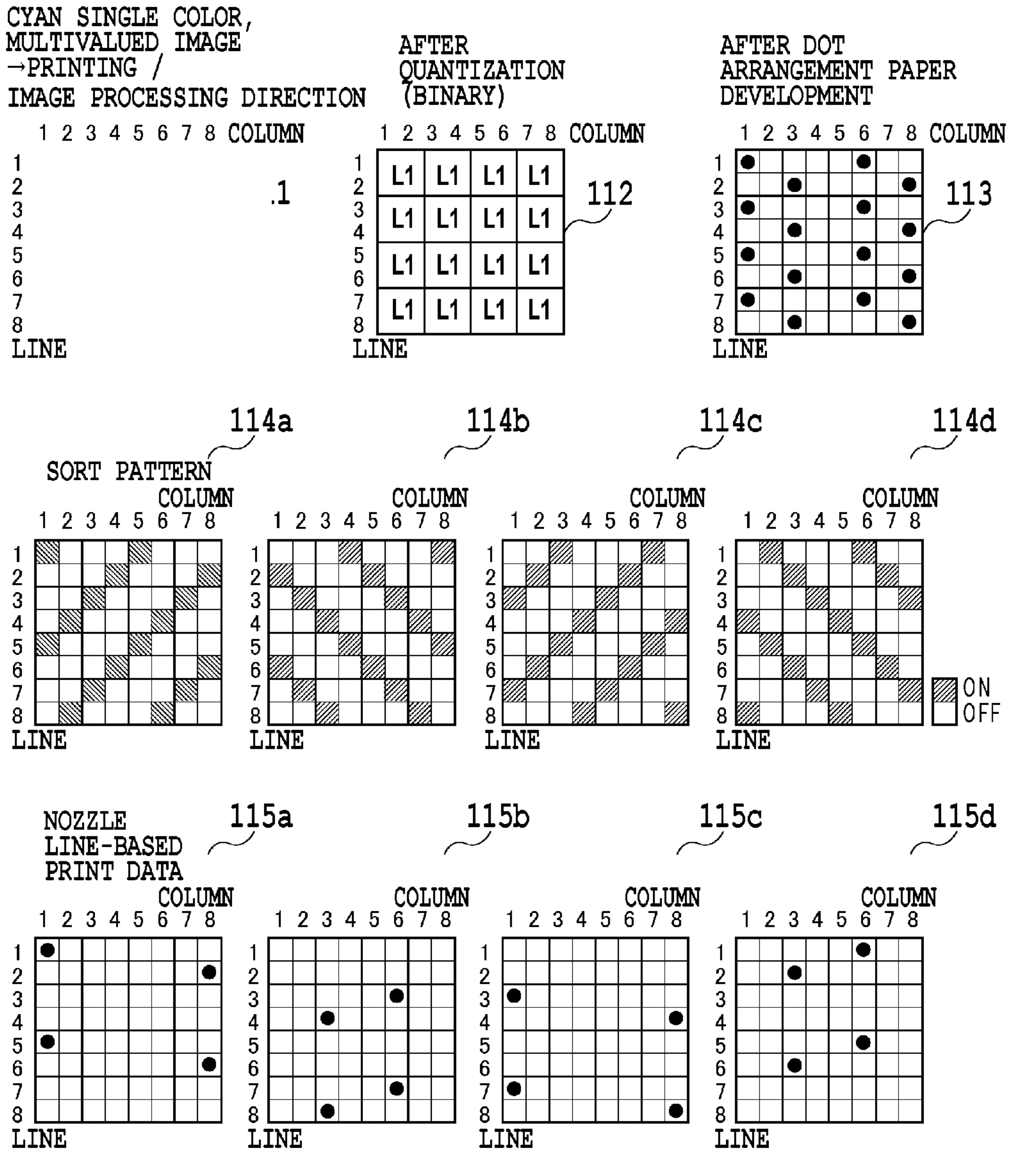
FIG. 11 is a diagram for explaining steps in which input image data corresponding to leading parts are subjected to the image processing.

In the following, FIGS. 10 and 11 are used to describe the image processing in the present embodiment. FIG. 10 is a block diagram for explaining the configuration of the image processing in the present embodiment. Also, FIG. 11 is a diagram for specifically explaining steps of processing input image data corresponding to leading parts by the image processing illustrated in FIG. 10.

In FIG. 11, Reference numeral 111 represents leading parts of input image data received by the image input part B100. In the present embodiment, one pixel in this step corresponds to 2×2 pixels in terms of the print resolution. 111 indicates a 4×4 pixel area corresponding to nozzle positions 1 to 8 in a y direction and column positions, i.e., first to eighth columns, in an x direction, and each of the pixels has cyan input image data having a signal value of i=63. As in the first embodiment, each block illustrated in FIG. 10 performs processing sequentially from the upper left pixel in the diagram in the x direction one-by-one pixel.

The inputted image data (i) are first subjected to a predetermined correction process by an image correction part B200. The specific correction method is the same as that in the first embodiment. That is, a lookup table that is prepared in advance is referred to, to obtain a correction amount Δi according to the combination of an integrated value stored in the ink integrated value retaining unit B700 and the image signal inputted from the image input part B100, and the input image signal value i is converted to the signal value i'. At this time, one pixel area subjected to the process by the image correction part B200 of the present embodiment corresponds to a 2×2 pixel area in terms of the print resolution. Therefore, the image correction part B200 of the present embodiment calculates the ink concentration integrated average value from ink concentration integrated values of 2 nozzles×4 lines, i.e., eight nozzles.

A quantization part B300 of the present embodiment quantizes the inputted multivalued data to any of five values from levels 0 to 4. As a method for the quantization, a widely known method such as a multivalued error diffusion method or dither method can be employed. Reference numeral 112 represents the result of quantizing the multivalued data (64) to five values by the quantization part B300. Here, regarding all of the 4×4 pixels, the quantization results are the level 1.

The five-valued data outputted from the quantization part B300 are inputted to a dot arrangement paper development part B800 and converted into dot patterns in 2×2 pixels.

Figure 12:
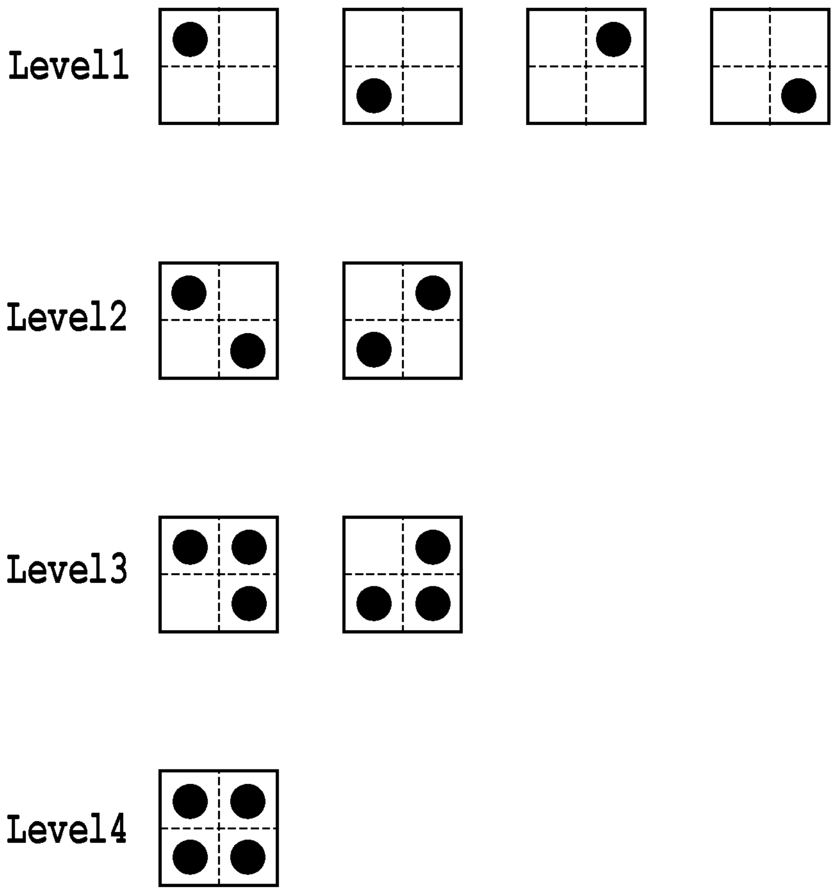
FIG. 12 is a schematic diagram for explaining dot arrangement corresponding to each level.

FIG. 12 is a schematic diagram for explaining dot arrangement corresponding to each of the levels. The pixel area in input data corresponds to the 2 pixels×2 pixels area in output data, and the value of 0 to 4 is converted to binary data indicating printing (1) or non-printing (0) of a dot.

For example, in the case where the quantized value corresponds to the level 1, the dot is arranged in only one of the 2×2 pixels. In this case, four arrangement patterns can be prepared. Also, in the case of the level 2 or 3, two arrangement patterns can be prepared, and in the case of the level 4, one arrangement pattern can be prepared. In the present embodiment, such a plurality of patterns belonging to the same level value is repeatedly used sequentially in the x direction. Reference numeral 113 in FIG. 11 represents the dot pattern after the conversion by the dot arrangement paper development part B800.

The output data from the dot arrangement paper development part B800 are inputted to the dot arrangement nozzle array development part B400. The process performed in the dot arrangement nozzle array development part B400 is the same as that in the first embodiment. That is, between each of mask patterns indicated by 114*a* to 114*d* and the dot pattern 113, the AND process is performed to obtain dot patterns 115*a* to 115*d* respectively corresponding to nozzle arrays A71*a* to A71*d*.

The dot data on each of the nozzle arrays outputted from the dot arrangement nozzle array development part B400 are sent to the ink concentration calculation part B600, where as in the first embodiment, the ink concentration integrated value is calculated for each nozzle and stored in the ink concentration integrated value retaining unit B700.

At the time of performing the following correction process on the target pixel, the image correction part B200 calculates the ink concentration integrated average value from ink concentration integrated values of eight nozzles (2 nozzles×4 nozzle arrays) corresponding to the area of the target pixel, and uses it to convert the input image signal value i to the signal value i'.

According to the present embodiment, although as with the first embodiment, an ink concentration integrated value is obtained for each nozzle, the value can be used to correct image data having a lower resolution than the print resolution. Therefore, the same effect as that of the first embodiment can be obtained, and a stable image having no density change can be outputted.

Third Embodiment

In the present embodiment, a serial type inkjet printing apparatus is applied.

Figure 13B:
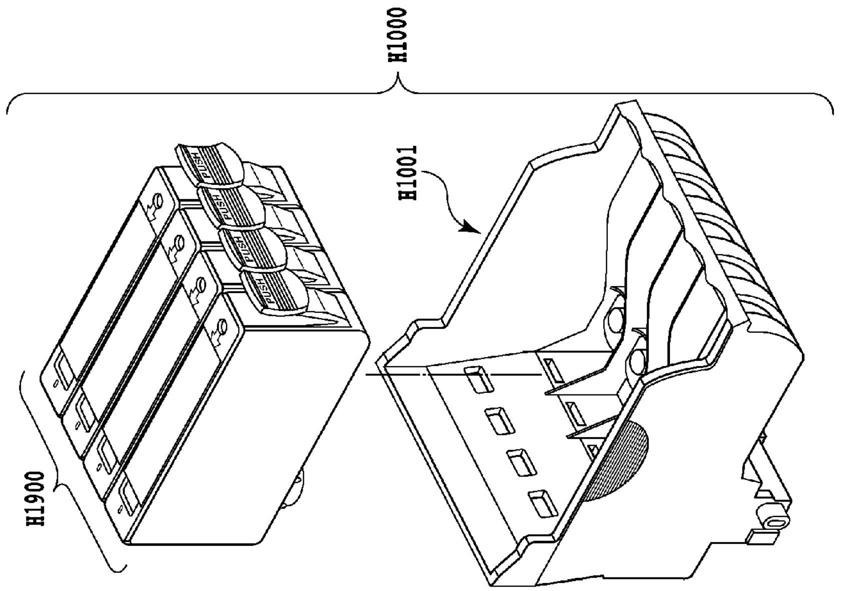
FIGS. 13A and 13B are perspective views of a serial type inkjet printing apparatus.
Figure 13A:
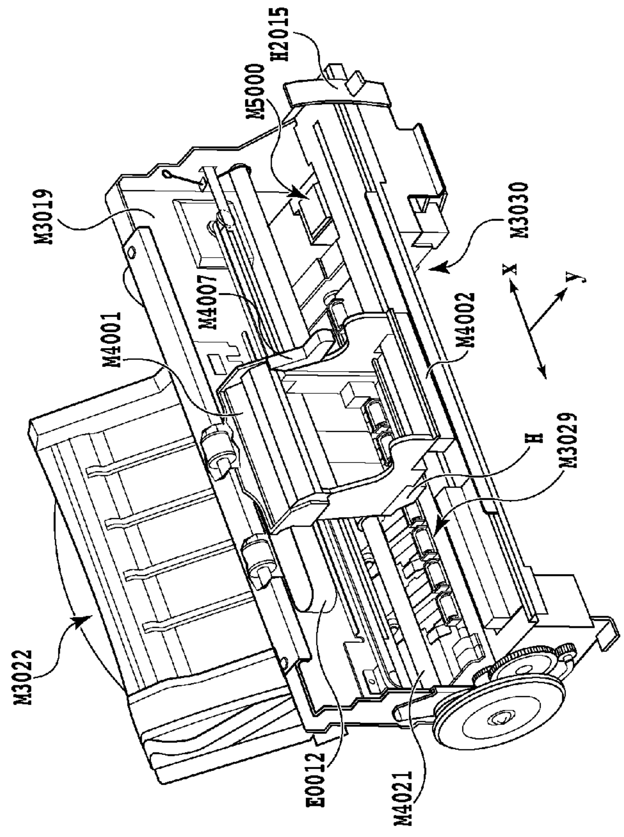

FIGS. 13A and 13B are perspective views for explaining the internal configuration of the serial type inkjet printing apparatus used in the present embodiment. FIG. 13A is a configuration diagram of the main body, and FIG. 13B is a configuration diagram of the print cartridge.

A chassis M3019 contained in the outer case member of the printing apparatus is formed of a plurality of plate-like metal members having predetermined rigidity to constitute a framework of the printing apparatus, and retains respective mechanisms described below. An automatic feeding part M3022 automatically feeds print media into the main body of the apparatus. A conveying part M3029 guides the print media, which are fed one by one from the automatic feeding part M3022 to a predetermined print position, and also guides the print media from the print position to a discharge part M3030. An arrow y represents the conveying direction (sub scanning direction) of the print media, and also the direction in which nozzles in the print head part H are arrayed. A print medium conveyed to the print position is subjected to desired printing by the print head part H that ejects inks while moving in an x direction. A recovery part M5000 performs the predetermined recovery process on the print head H. A distance-to-paper adjustment lever M2015 is a lever for adjusting the distance between the ejection port surface of the print head part H and the print medium.

A carriage M4001 is supported by a carriage shaft M4021 so as to be movable in a main scanning direction indicated by the arrow x. The carriage M4001 is mounted with an inkjet print head cartridge H1000 in removable state that can eject the inks.

Referring to FIG. 13B, the print head cartridge H1000 is configured to include: the print head part H provided with printing elements for performing ejection; and an ink tank holder H1001. Each of ink tanks H1900 is adapted to be attachable/detachable to/from the print head cartridge H1001 as illustrated in the diagram, and from each of the tanks, ink is supplied to a corresponding nozzle array. In the present embodiment, inks respectively having four colors of black, cyan, magenta, and yellow are used to configure the print head having one-line based nozzle arrays for ejecting the respective color inks.

In the print head in the present embodiment, nozzles that eject the same color are arrayed in the y direction at predetermined pitches, and nozzle arrays that eject inks having different colors from each other are arranged in the x direction in a parallel position.

The carriage M4001 is provided with a carriage cover M4002 for guiding the print head cartridge H1001 to a predetermined attachment position on the carriage M4001. Further, the carriage M4001 is provided with a head set lever M4007 that engages with the tank holder of the print head cartridge H1001 to set the print head cartridge H1001 in the predetermined attachment position. The head set level M4007 is provided so as to be rotationally movable with respect to a head set lever shaft that is positioned in an upper part of the carriage M4001, and an engagement part that engages with the print head cartridge H1001 is provided with a head set plate (not illustrated) that is biased by a spring. The head set lever M4007 is attached to the carriage M4001 by pressing the print head cartridge H1001 with the force of the spring. The print head cartridge H1001 mounted on the carriage H4001 obtains a head driving signal necessary for printing from a main board through a flexible cable E0012.

By alternately performing the print main scan that scans the carriage M4001 in the x direction and simultaneously ejects the inks from respective nozzles onto the print medium according to print data, and conveying operation that conveys the print medium in the y direction, the image is printed on the print medium.

Figure 14:
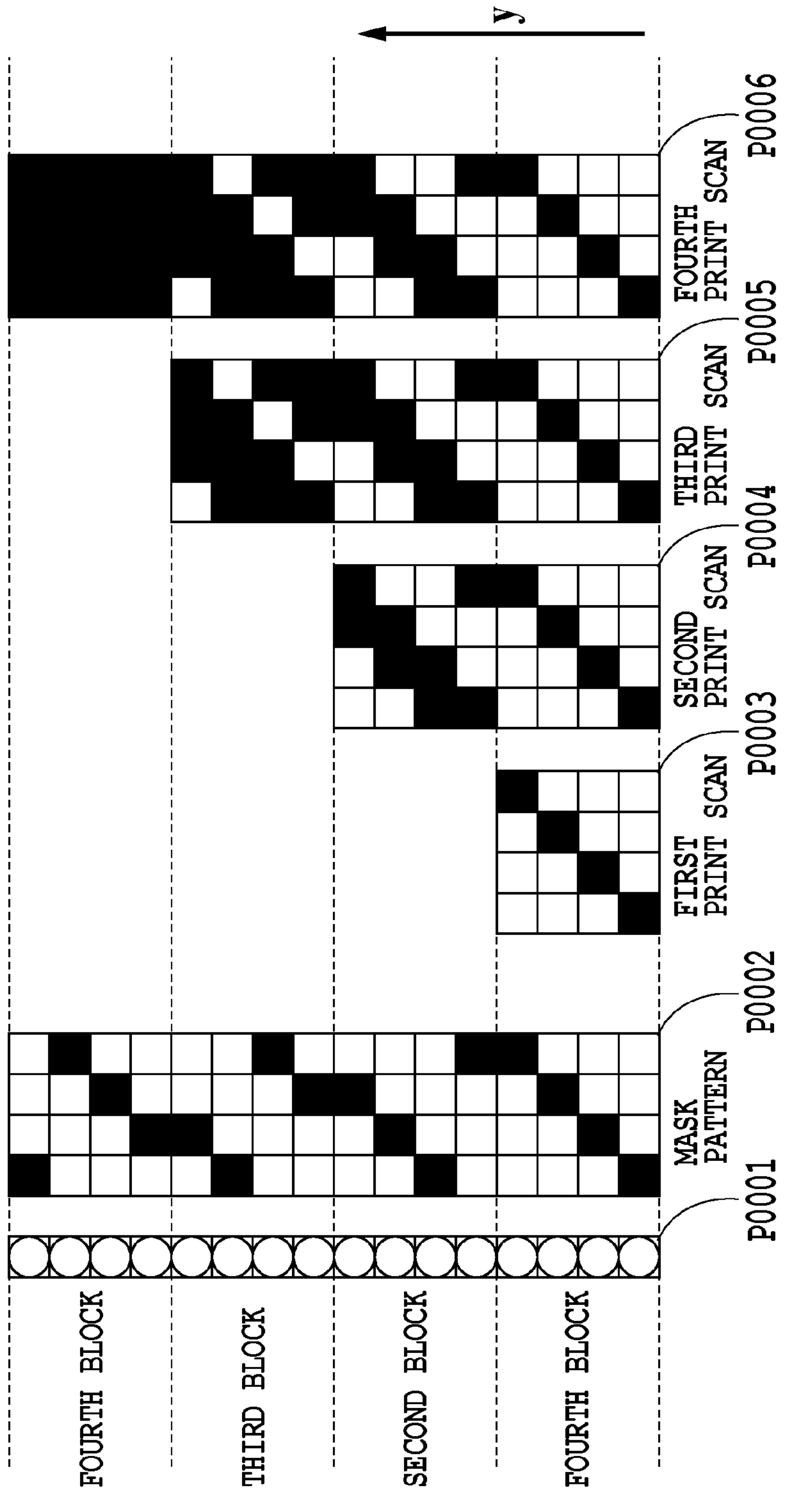
FIG. 14 is a diagram that explains a 4-pass multipass printing method.

FIG. 14 is a diagram that explains a 4-pass multipass printing method performed by the printing apparatus of the present embodiment. P0001 represents the print head, and for simplicity here, the print head is assumed to have 16 nozzles. In the case of 4-pass multipass printing, the 16 nozzles are, as illustrated in the diagram, divided into four nozzle blocks of first to fourth nozzle blocks, and each of the blocks includes four nozzles. P0002 represents mask patterns, and a print-permitted area for each of the nozzles is filled in black. The patterns printed by the respective nozzle blocks have a mutually complementary relationship, and are configured to complete printing in the area corresponding to 4×4 print pixels by being superposed.

Respective patterns represented by P0003 to P0006 show a process in which an image is completed by repeating the print scan. Every time each of the print scans is terminated, a print medium is conveyed in the y direction by an amount equal to the width of the block. Therefore, the image of the same area (area corresponding to the width of each of the nozzle blocks) of the print medium is c completed by four print scans.

Figure 15:
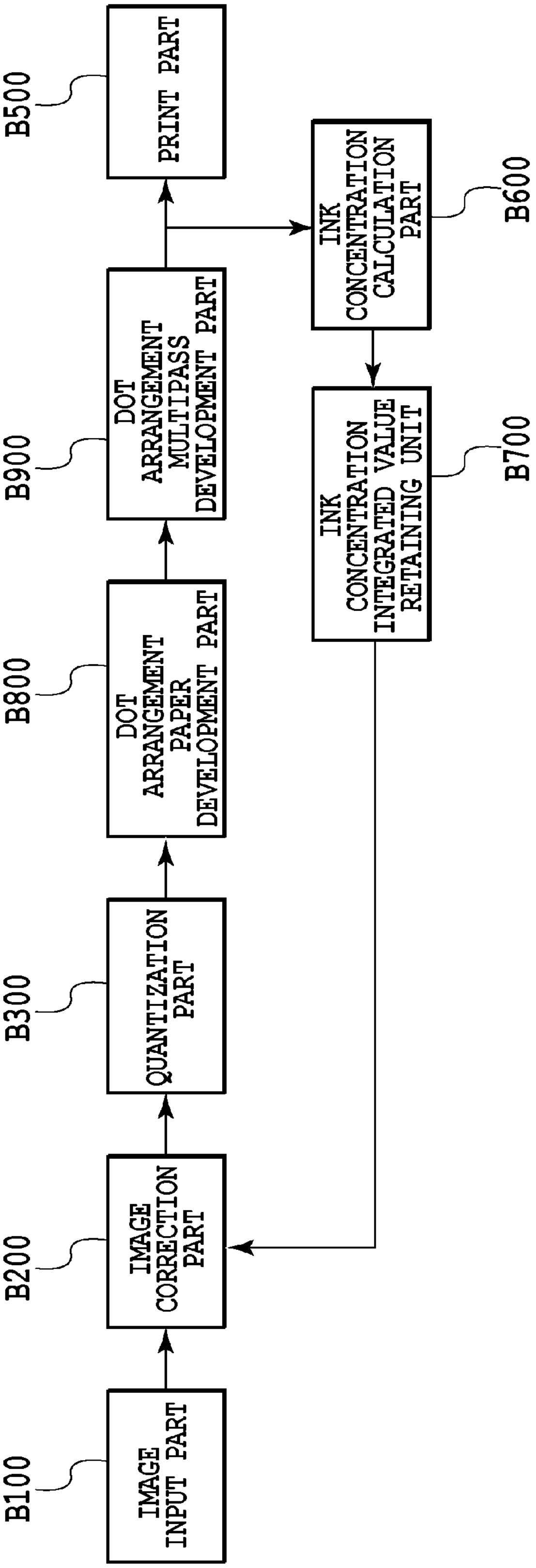
FIG. 15 is a block diagram for explaining image processing in the third embodiment.

FIG. 15 is a block diagram for explaining image processing in the present embodiment. In the present embodiment, as in the second embodiment, the image processing is for the case where the print resolution of the printing apparatus is twice as large as the image resolution inputted to the image input part. Also, it is assumed that the first to fourth print scans in the multipass printing are performed in the same direction, and the image processing of respective pixels is performed one-by-one pixel in an order and direction in which actual printing is performed.

In FIG. 15, a point of difference from FIG. 10 described in the second embodiment is that the dot arrangement nozzle array development part B400 is replaced by the dot arrangement multipass development part B900. That is, in the second embodiment, the dot data generated by the dot arrangement paper development part B800 are distributed to the four nozzle arrays; however, in the present embodiment, dot data are distributed to the four print scans, i.e., the four nozzle blocks.

An image correction part B200 of the present embodiment calculates the ink concentration integrated average value from ink concentration integrated values of 2 nozzles×4 blocks, i.e., eight nozzles. Further, the image correction part B200 refers to the lookup table prepared in advance to obtain the correction amount Δi according to a combination of the ink concentration integrated average value and density data (i) inputted from the image input part B100, and converts the input signal value i to the signal value i'.

The quantization part B300 and the dot arrangement paper development part B800 in the present embodiment are the same as those in the second embodiment.

The dot arrangement multipass development part B900 uses the mask patterns as indicated by P0002 in FIG. 14 or 114*a* to 114*d* in FIG. 11 to distribute dot data generated by the dot arrangement paper development part B800 to the four nozzle blocks. The dot data generated as described are allocated to the respective blocks of the print head, and respectively printed by predetermined print scans.

Dot data in each of the blocks outputted from the dot arrangement multipass development part 900 are sent to an ink concentration calculation part B600, where as in the above embodiments, the ink concentration integrated value is calculated for each of the nozzles and stored in the ink concentration integrated value retaining unit B700.

Then, at the time of performing the correction process on the following target pixel, the image correction part B200 calculates the ink concentration integrated average value from ink concentration integrated values of eight nozzles (2 nozzles×4 blocks) corresponding to the area of the target pixel, and uses it to convert the input image signal value i to the signal value i'.

In the above, described as an example, is the case of dividing the nozzle arrays into the four blocks to perform the 4-pass multipass printing; however, it should be appreciated that the present invention can also respond to N- or more pass multipass printing in which nozzle arrays are divided into 5 or more blocks (N blocks), or to the case of performing 1-pass printing. In the case of the N-pass printing, the image correction part B200 corrects respective input image data on the basis of ink concentration integrated values of N nozzles involved in printing on the target pixel. In the case of the 1-pass printing, the number of ink concentration integrated values is one for each column, so that calculation of the average of a plurality of ink concentration integrated values can be omitted, and the ink concentration integrated value can be used in the image correction part B200 as it is.

According to the present embodiment, in the case of performing the multipass printing in the serial type printing apparatus, an ink concentration integrated value is obtained for each of the nozzles, the value can be used to correct image data having a lower resolution than the print resolution. Therefore, the same effect as those of the above embodiments can be obtained, and a stable image having no density change can be outputted.

Note that, in the above, described is a configuration in which the average value of ink concentration integrated values of a plurality of nozzles involved in printing on the target pixel is used to perform the image correction process. However, the present invention is not limited to such a configuration. If a parameter that reflects ink concentration integrated values of a plurality of nozzles involved in printing on a target pixel is available, it can be used for the image correction process. For example, a value obtained from a sum of ink concentration integrated values of a plurality of nozzles, or in addition from a predetermined function, may be used.

Also, in the above, the lookup table (FIG. 6) for obtaining the correction amount Δi from the ink concentration integrated average value and the input image data value i is prepared; however, it should be appreciated that the present invention is not limited to such a configuration, as well. In the case of preparing the lookup table, a lookup table for directly obtaining corrected image data i' from the ink concentration integrated average value and input image data i can also be prepared. Also, without using such a lookup table, a function that can calculate corrected data by inputting the ink concentration integrated average value and input image data can also be prepared in advance. The same holds true for the table illustrated in FIG. 4. It is not the table for obtaining the variation ΔC in ink concentration integrated value from the current ink concentration integrated value C and print data but a table that enables the ink concentration integrated value C after correction to be obtained directly from these two parameters that may be set.

In any case, if a configuration in which from binary data corresponding to the number of times of ejection by each nozzle, a parameter such as an ink concentration integrated value indicating a degree of ink concentration of the nozzle is obtained, and the parameter is used to correct image data that the nozzle is involved in printing is achieved, the configuration is within the scope of the present invention.

In addition, the present invention may be configured to, before generating binary data by the quantization process, on the basis of multivalued data, generate a plurality of multivalued data respectively corresponding to a plurality of scans. For example, in the case of performing 2-pass printing that prints an image having a signal value of 100 by two scans, distribution is made such that data corresponding to the first scan is 50 and data corresponding to the second scan is 50. The present invention may be configured to subsequently quantize each of the data to generate binary data, and perform the processing described with use of FIG. 16 on each of the data on the respective scans.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2011-105243, filed May 10, 2011 and 2012-094791, filed Apr. 18, 2012, which are hereby incorporated by reference herein in their entirety.

What is claimed is:

1. An image processing method for printing an image on a print medium by a relative scan between the print medium and a print head provided with a plurality of nozzles that eject ink, the method comprising:

an obtaining step of obtaining multi-valued data corresponding to a first pixel to be printed on the print medium by using a nozzle included in the plurality of nozzles, and a first parameter that indicates a concentration degree of ink in the nozzle at a timing for printing the first pixel;

a determining step of determining, on the basis of the obtained first parameter and the multi-valued data corresponding to the first pixel, a correction value;

a first generating step of generating, on the basis of the determined correction value and the multi-valued data, corrected multi-valued data;

a second generating step of generating, on the basis of the corrected multi-valued data, ejection data that indicates ejection or non-ejection of the ink from the nozzle; and a third generating step of generating, on the basis of the first parameter and the ejection data, a second parameter that indicates a concentration degree of ink in the nozzle at a timing for printing a second pixel that is a pixel printed next to the first pixel, by the nozzle, on the print medium, wherein a correction value that is determined, in the determining step, in a case where the concentration degree of the ink in the nozzle indicated by the first parameter is a first degree, is larger than a correction value that is determined, in the determining step, in a case where the concentration degree of the ink in the nozzle indicated by the first parameter is a second degree, which is lower than the first degree.

2. The image processing method according to claim 1, further comprising a printing step of, on the basis of the ejection data generated by the second generating step, printing an image on the print medium.

3. The image processing method according to claim 1, wherein in the second generating step, the ejection data is binary data.

4. The image processing method according to claim 1, wherein the print head performs printing on the first pixel by a plurality of nozzles, and in the obtaining step, the first parameter is obtained for each of the plurality of nozzles.

5. The image processing method according to claim 4, wherein in the first generating step, an average value of the first parameters of the plurality of nozzles is calculated, and on the basis of the multi-valued data corresponding to the first pixel and the average value, the corrected multi-valued data is generated.

6. The image processing method according to claim 4, wherein in the second generating step, a resolution of the corrected multi-valued data is lower than the resolution of the ejection data.

7. The image processing method according to claim 4, wherein the third generating step generates the second parameter for each of the plurality of nozzles, the image processing method further comprising an acquiring step of acquiring an average value of the second parameters for the plurality of nozzles.

8. An image processor for printing an image on a print medium by a relative scan between the print medium and a print head provided with a plurality of nozzles that eject ink, the image processor comprising:

an obtaining unit configured to obtain multi-valued data corresponding to a first pixel to be printed on the print medium by using a nozzle included in the plurality of nozzles, and a first parameter that indicates a concentration degree of ink in the nozzle at a timing for printing the first pixel;

a determining unit configured to, on the basis of the obtained first parameter and the multi-valued data corresponding to the first pixel, determine a correction value;

a first generating unit configured to, on the basis of the determined correction value and the multi-valued data corresponding to the first pixel, generate corrected multi-valued data;

a second generating unit configured to, on the basis of the corrected multi-valued data, generate ejection data that indicates ejection or non-ejection of the ink from the nozzle; and a third generating unit configured to, on the basis of the first parameter and the ejection data, generate a second parameter that indicates a concentration degree of ink in the nozzle at a timing for printing the second pixel that is a pixel printed next to the first pixel, by the nozzle, on the print medium, wherein a correction value that is determined in a case where the concentration degree of the ink in the nozzle indicated by the first parameter is a first degree, is larger than a correction value that is determined in a case where the concentration degree of the ink in the nozzle indicated by the first parameter is a second degree, which is lower than the first degree.

9. An image processing method for printing an image on a print medium by a relative scan between the print medium and a print head provided with a plurality of nozzles that eject ink, the method comprising:

an obtaining step of obtaining multi-valued data corresponding to a first pixel to be printed on the print medium by using a nozzle included in the plurality of nozzles, and a first parameter that indicates a concentration degree of ink in the nozzle at a timing for printing the first pixel;

a determining step of determining, on the basis of the obtained first parameter and the multi-valued data corresponding to the first pixel, a correction value;

a first generating step of generating, on the basis of the determined correction value and the multi-valued data corresponding to the first pixel, corrected multi-valued data; and a second generating step of generating, on the basis of the first parameter and the corrected multi-valued data, a second parameter that indicates a concentration degree of ink in the nozzle at a timing for printing a second pixel that is a pixel printed next to the first pixel, by the nozzle, on the print medium, wherein a correction value that is determined, in the determining step, in a case where the concentration degree of the ink in the nozzle indicated by the first parameter is a first degree, is larger than a correction value that is determined, in the determining step, in a case where the concentration degree of the ink in the nozzle indicated by the first parameter is a second degree which is lower than the first degree.

10. An image processing method for printing an image on a print medium by a relative scan between the print medium and a print head in a scan direction, the print head being provided with a plurality of nozzles that eject ink, the method comprising:

a first obtaining step of obtaining multi-valued data corresponding to a first pixel on the print medium, and a first parameter that indicates a concentration degree of ink in a predetermined nozzle included in the plurality of nozzles at a timing when the predetermined nozzle is relatively positioned at position corresponding to the first pixel;

a first generating step of generating, on the basis of the first parameter and the multi-valued data corresponding to the first pixel, corrected multi-valued data corresponding to the first pixel;

a second generating step of generating, on the basis of the corrected multi-valued data, ejection data that indicates ejection or non-ejection of the ink from the predetermined nozzle to the first pixel; and a third generating step of generating, on the basis of the first parameter and the ejection data, a second parameter that indicates a concentration degree of ink in the predetermined nozzle at a timing when the predetermined nozzle is relatively positioned at a position corresponding to a second pixel that is next to the first pixel in the scan direction on the print medium, such that (i) in a case that the ejection data indicates ejection of the ink to the first pixel, and a value of the first parameter is a predetermined value, a value of the second parameter is a first value, and (ii) in a case that the ejection data indicates ejection of the ink to the first pixel, and the value of the first parameter is larger than the predetermined value, a value of the second parameter is a second value, which is larger than the first value and smaller than the value of the first parameter.

11. The image processing method according to claim 10, further comprising:

a printing step of printing, on the basis of the ejection data generated by the second generating step, an image on the print medium.

12. The image processing method according to claim 10, wherein in the second generating step, the ejection data is binary data.

13. The image processing method according to claim 10, wherein the print head performs printing on the first pixel by a plurality of nozzles, and in the obtaining step, the first parameter is obtained for each of the plurality of nozzles.

14. The image processing method according to claim 13, wherein in the first generating step, an average value of the first parameters of the plurality of nozzles is calculated, and on the basis of the multi-valued data corresponding to the first pixel and the average value, the corrected multi-valued data is generated.

15. The image processing method according to claim 13, wherein in the second generating step, a resolution of the corrected multi-valued data is lower than the resolution of the ejection data.

16. The image processing method according to claim 13, wherein the third generating step generates the second parameter for each of the plurality of nozzles, and the image processing method further comprises:

an acquiring step of acquiring an average value of the second parameters for the plurality of nozzles.

17. The image processing method according to claim 10, wherein in the third generating step, the first value is zero.

18. The image processing method according to claim 17, wherein in the determining step, the correction value corresponding to the second pixel that is generated in a case that the value of the second parameter is relatively high, is larger than the correction value corresponding to the second pixel that is generated in a case that the value of the second parameter is relatively low.

19. The image processing method according to claim 10, wherein in the third generating step, the second value is larger than zero.

20. The image processing method according to claim 10, wherein the second parameter is generated, in the third generating step, such that (iii) in a case that the ejection data indicates non-ejection of the ink to the first pixel, the value of the second parameter is larger than the value of the first parameter.

21. The image processing method according to claim 10, further comprising:

a second obtaining step of obtaining multi-valued data corresponding to the second pixel;

a determining step of determining, on the basis of the second parameter and the multi-valued data corresponding to the second pixel, a correction value corresponding to the second pixel;

a fourth generating step of generating, on the basis of the correction value corresponding to the second pixel and the multi-valued data corresponding to the second pixel, corrected multi-valued data corresponding to the second pixel;

a fifth generating step of generating, on the basis of the corrected multi-valued data corresponding to the second pixel, ejection data that indicates ejection or non-ejection of the ink from the predetermined nozzle to the second pixel.

22. The image processing method according to claim 10, further comprising:

a fourth generating step of generating, on the basis of the second parameter and the multi-valued data corresponding to the second pixel, corrected multi-valued data corresponding to the second pixel.

* * * * *